Nov. 12, 1940.   F. L. BISHOP ET AL   2,221,367
MANUFACTURE OF LAMINATED GLASS
Filed May 6, 1933   2 Sheets-Sheet 1

INVENTORS
Frederic L. Bishop,
Robert H. Du Bois,
Patrick Finnegan

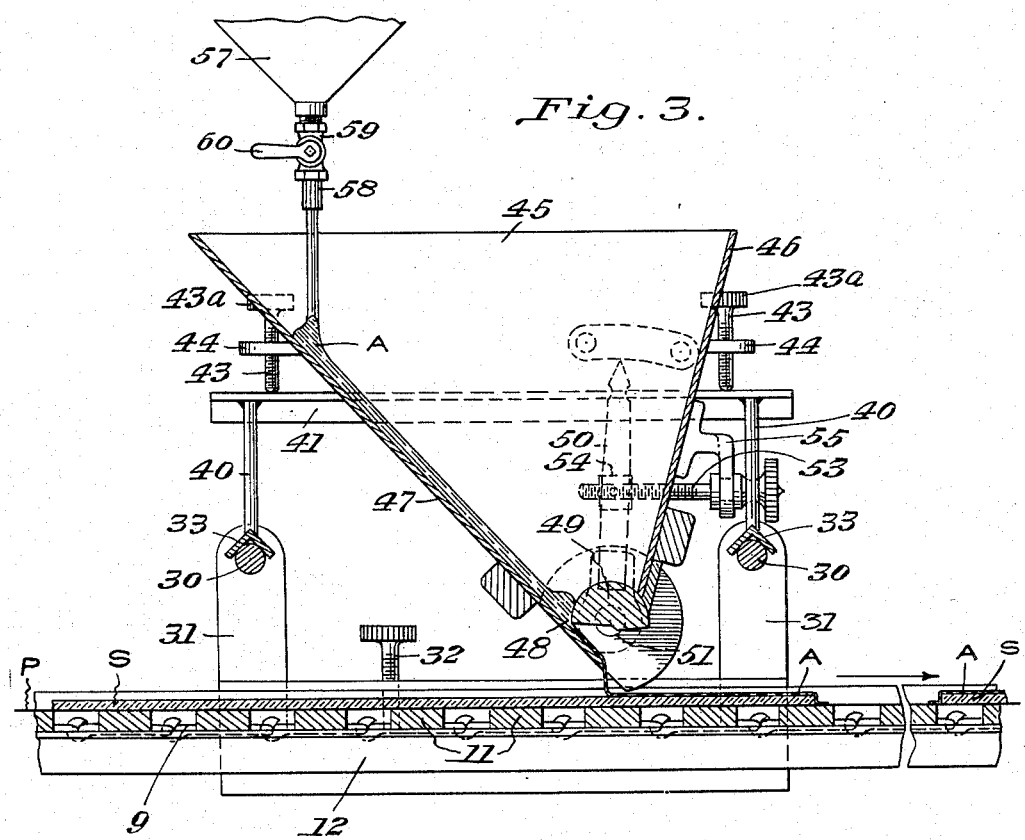
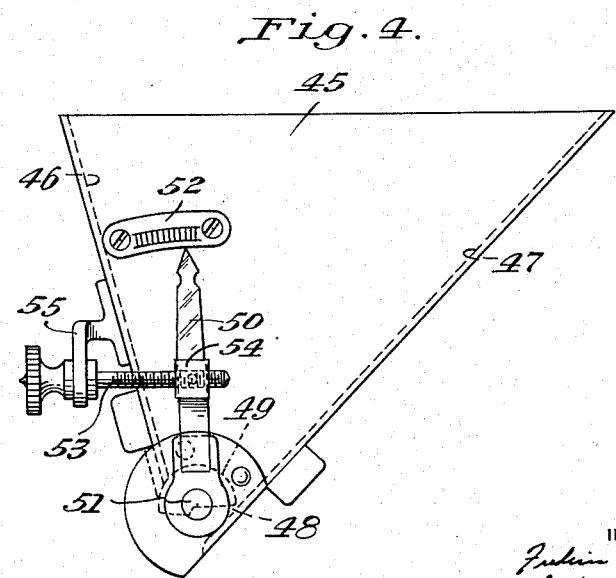

Patented Nov. 12, 1940

2,221,367

UNITED STATES PATENT OFFICE 2,221,367

MANUFACTURE OF LAMINATED GLASS

Frederic L. Bishop, Fox Chapel Manor, and Robert H. Du Bois and Patrick Finnegan, Jeannette, Pa., assignors to American Window Glass Company, Pittsburgh, Pa., a corporation of Pennsylvania Application May 6, 1933, Serial No. 669,736

5 Claims. (Cl. 49—81)

The present invention relates to the manufacture of laminated glass. By it we provide a new and useful method of manufacture which is far superior to any method now used or known and which results in an improved product, and improved apparatus for carrying out the method.

Heretofore, numerous methods or processes of manufacturing laminated glass have been practiced. In all of the successful methods of manufacturing laminated glass practiced heretofore, a sandwich of two sheets of glass and an interposed sheet of strengthening material has been formed. The strengthening material used in practically all instances where a successful product has been made has been a cellulose composition material, such as cellulose nitrate or cellulose acetate. In the prior practices, the two sheets of glass to be placed together have been mechanically or chemically cleaned and a formed sheet of strengthening material placed between the two glass sheets and rigidly united thereto. Many different methods of uniting the sheet of cellulose composition material or other strengthening material to the glass sheets have been utilized. In many instances, the interposed sheet of strengthening material has been cemented to the glass sheets by adhesives of various kinds. In other instances, the union between the sheet of strengthening material and the glass sheets has been effected by softening the sheet of strengthening material and uniting the composite under pressure in the presence of heat.

In the copending application of Frederic L. Bishop and Charles S. Shoemaker, Serial No. 658,598, filed February 25, 1933, there is described a method of manufacturing laminated glass wherein a liquid strengthening material is flowed on one surface of at least one of two glass sheets, the strengthening layer dried, and the two glass sheets thereafter united with the layer of strengthening material therebetween. In carrying out the process described in the above referred to application, the strengthening material may be flowed on the surfaces of the glass sheets by hand, by means of a tank having a plurality of funnels disposed above the glass sheets, or by the method which we provide.

We have found that highly desirable and much more satisfactory results can be obtained by first forming a film of the liquid strengthening material and flowing the film over the glass sheets. Accordingly, by our invention we provide a process wherein a film of the strengthening material is first formed and flowed substantially uniformly over one or both of the glass sheets to be formed into the sandwich, and apparatus which may be used in carrying out this process.

In carrying out our invention, the glass sheets are first mechanically or chemically cleaned. A film of the liquid strengthening material is then formed and flowed uniformly over at least one of the glass sheets. We prefer to flow the strengthening material on both of the glass sheets to be formed into a sandwich, but sufficient strengthening material can be obtained by merely flowing it on one of the two sheets to be united.

After the sheet or sheets have been coated with the film of strengthening material, the strengthening material is permitted to flow over the glass sheets so as to become substantially uniformly distributed thereover. Of course, where sheet glass is used, the film of strengthening material will not be of a uniform thickness throughout the whole area of the glass sheet, due to the irregularities in the surface thereof. However, where polished or plate glass is used, the film on the glass will be of substantially the same thickness throughout the whole area of the sheet. Regardless of whether plate glass or sheet glass is used, and regardless of the irregularities on the surface of the glass sheet, the film of strengthening material after flowing along the glass sheet has ceased will have a surface which is substantially optically flat.

After the film has been so formed, it is dried and one coated glass sheet rigidly united to an uncoated glass sheet, or two coated glass sheets rigidly united together. Rigid union between the glass sheets with the strengthening material therebetween may be obtained by first softening the strengthening material by means of a plasticizer or a solvent for the strengthening material, and then subjecting the composite to pressure. Rigid union may also be obtained by merely subjecting the sandwich to pressure in the presence of heat. The pressures required for uniting the glass sheets, particularly where two coated glass sheets are united, are very slight. Even the weight of the one glass sheet will exert sufficient pressure in order to cause rigid union.

It has heretofore been proposed to pour the strengthening material on the glass sheets by hand. Where this procedure was followed, difficulty was encountered in retaining the liquid strengthening material on the top surfaces of the glass sheets on which it was flowed. In order to obviate this difficulty, the use of forms for preventing the strengthening material from flowing over the edges of the glass sheets has been proposed. Even where forms are used, the liquid strengthening material will flow over the edges of the glass sheets to a certain extent, unless the forms are of the exact dimensions of the glass sheets to be coated. In the copending application of Frederic L. Bishop, Serial No. 658,599, there is described a process wherein the use of forms may be obviated. The present invention may be practiced either where forms are used or where they are not used for retaining the liquid strengthening material on the glass sheets.

In the accompanying drawings we have shown for purposes of illustration only, a preferred embodiment of the apparatus provided by our invention, and which may be used in carrying out our improved process. It will be understood, of course, that we do not propose to be limited to the structure illustrated in the drawings or hereinafter described, as our invention may be otherwise practiced or embodied within the scope of the appended claims.

In the drawings—

Figure 3 is a sectional view taken along the line III—III of Figure 2; and

Figure 4 is an end elevational view of the flow machine showing the end thereof opposite to that shown in Figure 1.

Figure 1:
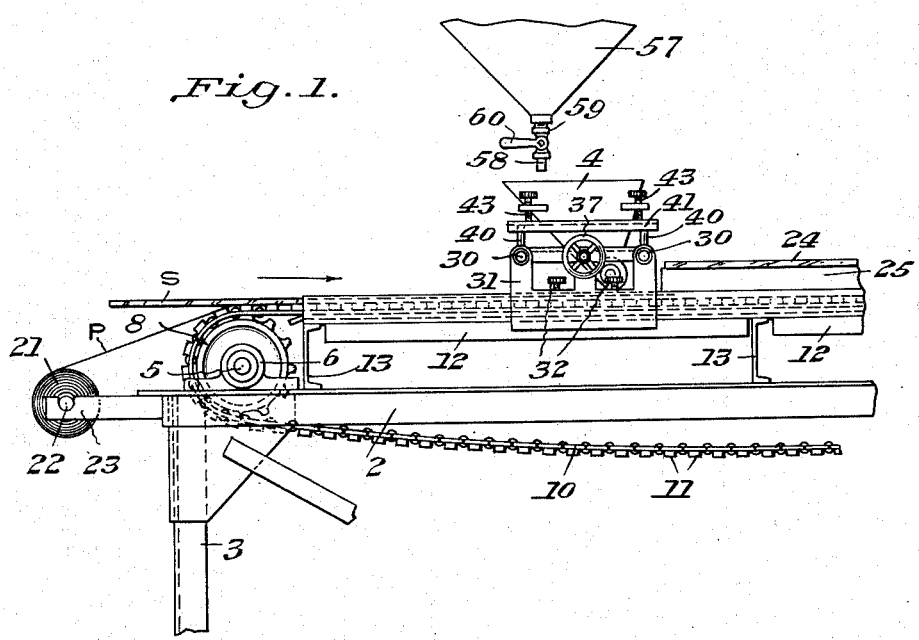
Figure 1 is a partial side elevational view of apparatus which may be used in carrying out our invention.
Figure 2:
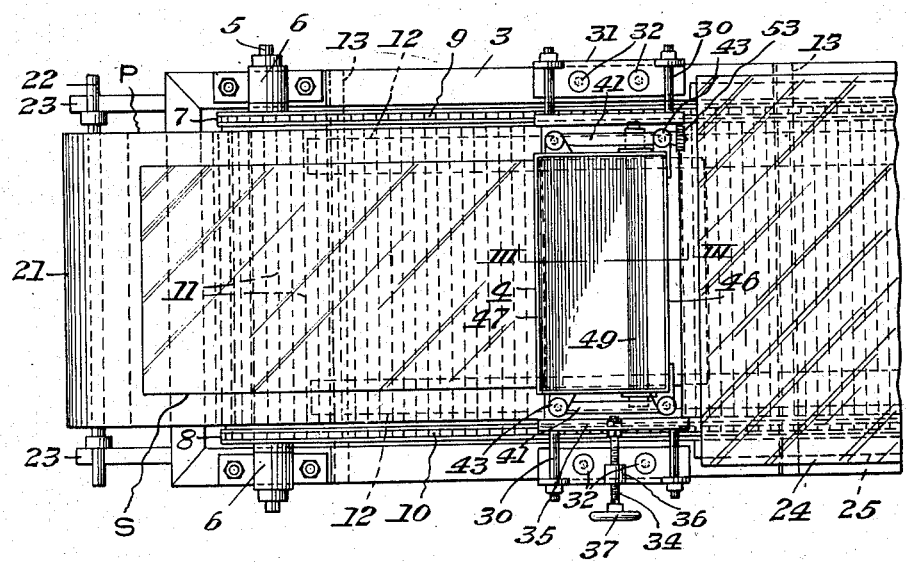
Figure 2 is a plan view of the apparatus shown in Figure 1.

In carrying out our improved process on apparatus such as that shown in the drawings, the glass sheets are first either mechanically or chemically cleaned. Each glass sheet S to be coated is placed on a conveyor mechanism indicated generally by the reference character 2, which is mounted on a frame indicated generally by the reference character 3. The conveyor mechanism carries each glass sheet S past a flow machine indicated generally by the reference character 4, which is used for substantially uniformly flowing the strengthening material on each of the glass sheets.

The conveyor mechanism may be of any desired type or construction. As shown in the drawings, a cross shaft 5 is mounted in suitable bearings 6 on the charging end of the conveyor. The cross shaft 5 carries sprocket wheels 7 and 8 located adjacent the bearings 6. A similar cross shaft and similar sprocket wheels (not shown) are provided adjacent the discharge end of the conveyor. The sprocket wheels 7 on one side of the conveyor mechanism carry a chain 9 and the sprocket wheels 8 carry a similar chain 10 on the other side of the conveyor mechanism. Either the shaft 5 or the similar shaft at the other end of the conveyor may be driven by a motor (not shown) for moving the continuous chains 9 and 10.

The chains 9 and 10 carry transversely extending spaced slats 11 which are adapted to support the glass sheets on the conveyor. The slats 11 may be supported intermediate the ends thereof by longitudinally extending T-shaped beams 12 which are supported on each end of the conveyor frame and in the center thereof by transversely extending channels 13.

A roll 21 of paper P or other suitable material is carried by a shaft 22 mounted in suitable bearings 23 adjacent the charging end of the conveyor. The paper P is placed over the conveyor slats beneath the glass sheets as they pass thereover, and is for the purpose of preventing the solution flowed on the glass sheets from getting on the conveyor mechanism.

It will be understood that the glass sheets may be laid directly on the paper P as they are carried by the conveyor past the flowing machine, or they may be spaced above the paper by suitable blocks. Various other methods of preventing the liquid strengthening material from getting on and contaminating the conveyor mechanism may be used. For instance, the conveyor slats on which the glass sheets are supported may be considerably shorter than the transverse dimensions of the glass sheets thereon, and a trough may be provided along each side of the conveyor mechanism and beneath the glass sheets for the purpose of catching and disposing of any surplus liquid strengthening material flowed on the glass sheets or over the edges thereof.

A glass cover 24 is mounted on supports 25 on either side of the conveyor frame for shielding the coating on the glass sheets against dust or any other impurities that may be in the air, and which would stick to the newly formed coating. This glass cover is also for the purpose of providing a solvent-saturated chamber through which the glass sheets pass immediately after being coated. This will prevent the coating on the glass sheets from drying more quickly than desired.

The flow machine 4 is mounted on transversely extending rails 30 which are supported by standards 31 mounted on either side of the main frame of the conveyor. Clamping screws 32 are provided for clamping the standards 31 in any desired position along the main frame of the conveyor mechanism.

The frame for the flow machine comprises transversely extending angles 33 which are adapted to cooperate with the rails 30 so that the flow machine may be moved transversely of the conveyor. This transverse adjustment of the flow machine is effected through an adjusting screw 34, one end of which is rigidly attached to a cross bar 35 and the other end of which is threaded in a bearing 36 carried by the standard 31 on one side of the conveyor mechanism. A hand wheel 37 is provided on the end of the adjusting screw 34 to enable the operator to make the desired transverse adjustment. Legs 40 are rigidly secured to the angle irons 33 and extend upwardly therefrom. These legs support angle irons 41 at either end of the machine. These angle irons 41 are adapted to support the trough of the flow machine through adjusting screws 43 which are threaded in bearings 44 carried by the end plates 45 of the flow machine. The adjusting screws 43 have knurled heads 43a and are for the purpose of permitting vertical adjustment of the trough of the flow machine.

The trough comprises end plates 45, a front plate 46 and a rear or flow plate 47. All of these plates are welded or otherwise suitably secured together. The rear or flow plate 47 extends downwardly below the front plate 46 and at an angle to the horizontal. An opening 48 is provided between the front and rear plates adjacent the bottom of the flow machine and through which the strengthening material is flowed onto the glass sheets as they are carried past the flow machine by the conveyor mechanism. A valve 49 is provided in the opening 48 for regulating the quantity of the solution flowing over the flow plate 47 through the opening 48. An indicator arm 50 is attached to the shaft 51 of the valve and has a pointer on one end thereof for cooperating with a dial plate 52 for indicating the size of the opening through which the strengthening material flows. The size of the valve opening is regulated by a regulating screw 53, one end of which is threaded in a bearing 54 in the indicator arm 50. The other end of the regulating screw is mounted in a bearing 55 carried by the front plate 46.

A hopper 57 containing the solution to be flowed on the glass sheets is provided above the top opening of the trough. The hopper 57 may be provided with one or more nozzles 58 through which the solution is discharged from the hopper. A valve 59 having a handle 60 thereon may be provided for regulating the flow of the solution from the hopper to the trough of the flow machine.

Any desired quantity of the strengthening medium A to be flowed on the glass sheets may be maintained in the flow machine. We prefer, however, to retain only a small quantity of the solution therein at any time.

The flow plate 47 extends below the opening 48 and the quantity of the solution A passing over the lower portion thereof may be readily regulated by the valve 49. A film of the solution A is formed and substantially uniformly distributed over the portion of the flow plate 47 extending below the valve opening. This film passes over the lower portion of the flow plate and flows over the bottom edge thereof onto the glass sheets as they are carried past the flow machine by the conveyor mechanism. The conveyor may be operated at any desired speed and the size of the valve opening adjusted so as to obtain a film or coating of the solution on the glass sheets of any desired thickness. We have found that the speed of the conveyor should be sufficient to actually pull the film off the lower edge of the flow plate. It should not, however, be sufficient to destroy or affect the uniformity of the film of strengthening material. The distance between the glass sheet and the lower edge of the flow plate should be taken into consideration in the determination of the conveyor speed giving best results. Also, the angle of inclination of the inclined plate and the viscosity of the solution must be considered. Where a conveyor speed of four feet per minute is used and the solution is of the proper viscosity, the edge of the flow plate of the apparatus shown in the drawings should be approximately one-half inch above the glass sheet in order to give best results. The variables above discussed, however, may be varied in order to obtain best results. As stated, we have found that the film should be actually pulled off the lower edge of the flow plate.

Any suitable strengthening material in the form of a liquid may be flowed on the glass sheets in the manner above described. In carrying out our invention, we prefer to use a solution comprising a synthetic resin and a solvent therefor. The synthetic resin that we prefer is an ester of a monobasic fatty acid. We have found that a highly desirable product can be obtained by using an ester of acrylic acid.

As can be seen from the above, in carrying out our invention, a film of the liquid strengthening material is formed on the flow plate and is flowed on the glass sheets to be coated. The film passing over the flow plate is preferably of substantially uniform thickness. Even though there are irregularities in the valve opening, in passing over the flow plate therebelow the liquid strengthening material will tend to become uniformly distributed thereover, and of a uniform thickness.

After the glass sheets have been coated, the liquid strengthening material will tend to flow on the glass sheets and fill in irregularities in the surfaces of the sheets. The upper surface of the liquid strengthening material on each sheet will be substantially optically flat, despite irregularities on the surfaces of the sheets. This is of considerable importance for it enables the formation of a sandwich of two coated glass sheets with very slight pressures exerted thereon.

The films on the glass sheets are then permitted to dry and two of the coated glass sheets formed into a sandwich with the coated surfaces thereof together. It will be understood that one coated glass sheet may be united with an uncoated glass sheet, as well as with another coated sheet, in the formation of the composite sheet of laminated glass.

The union between the glass sheets may be effected by the use of a plasticizing agent and slight pressures or by the use of slight pressures in the presence of heat.

As may be readily seen, our invention possesses many improvements over the processes heretofore practiced. The process of flowing a liquid strengthening material on the glass sheets is considerably more economical than the presently practiced processes. Where a liquid strengthening material is flowed on the glass sheets, a rigid union between the glass sheets may be obtained by pressures materially lower than those now necessary in carrying out any of the present processes. In practicing our process, the weight of the uppermost glass sheet will exert sufficient pressure to cause a rigid union, whereas in the present practiced processes, pressures approximating 250 pounds per square inch are necessary in order to get a proper union.

While we have shown and described a preferred method and apparatus for carrying out our improved process, it will be understood that our invention may be otherwise embodied or practiced within the scope of the appended claims.

We claim:

1. In the manufacture of laminated glass, the steps comprising forming a film of a strengthening material, flowing the film on one surface of a glass sheet, drying the film, and uniting the coated sheet directly to a second glass sheet with the film therebetween.

2. In the manufacture of laminated glass, the steps comprising forming a film of a strengthening material, flowing the film on one surface of each of two glass sheets, drying the film, and uniting the coated glass sheets with the films together.

3. In the manufacture of laminated glass, the steps comprising forming a film of a solution comprising a strengthening material and a solvent therefor, flowing the film on one surface of at least one of two glass sheets, drying the film, and uniting the two glass sheets directly together with the strengthening material therebetween.

4. In the manufacture of laminated glass, the steps comprising forming a film of a solution comprising a synthetic resin strengthening material and a solvent therefor, flowing the film on one surface of at least one of two glass sheets, drying the film, and uniting the two glass sheets directly together with the strengthening material therebetween.

5. In the manufacture of laminated glass, the steps comprising forming a film of a solution comprising an acrylic acid ester strengthening material and a solvent therefor, flowing the film on one surface of at least one of two glass sheets, drying the film, and uniting the two glass sheets directly together with the strengthening material therebetween.

FREDERIC L. BISHOP.
ROBERT H. DU BOIS.
PATRICK FINNEGAN.